(12) United States Patent
Beers et al.

(10) Patent No.: US 12,421,974 B1
(45) Date of Patent: Sep. 23, 2025

(54) RAM AIR FAN INCLUDING BIMETALIC ADDITIVELY MANUFACTURED HEAT EXCHANGER INSERT

(71) Applicant: Hamilton Sundstrand Corporation, Charlotte, NC (US)

(72) Inventors: Craig Beers, Wethersfield, CT (US); Brent Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/654,617

(22) Filed: May 3, 2024

(51) Int. Cl.
| | |
|---|---|
| F04D 29/056 | (2006.01) |
| F16C 17/02 | (2006.01) |
| F16C 33/04 | (2006.01) |
| F16C 37/00 | (2006.01) |
| F16C 43/02 | (2006.01) |

(52) U.S. Cl.
CPC ............ *F04D 29/056* (2013.01); *F16C 17/02* (2013.01); *F16C 33/04* (2013.01); *F16C 37/00* (2013.01); *F16C 43/02* (2013.01)

(58) Field of Classification Search
CPC ........ F04D 29/056; F16C 17/02; F16C 33/04; F16C 37/00; F16C 43/02
See application file for complete search history.

(56) References Cited

U.S. PATENT DOCUMENTS

| | | | | |
|---|---|---|---|---|
| 4,786,238 A | * | 11/1988 | Glaser | .................. F01D 25/125 417/407 |
| 5,102,305 A | * | 4/1992 | Bescoby | ................. F01D 25/22 417/407 |
| 6,787,933 B2 | * | 9/2004 | Claude | .................... H02P 9/307 322/27 |
| 6,962,483 B2 | | 11/2005 | Ganesh et al. | |
| 10,008,899 B2 | * | 6/2018 | Nelson | ...................... H02K 5/12 |
| 10,487,688 B2 | * | 11/2019 | Venter | .................. F01D 25/166 |
| 10,538,460 B2 | * | 1/2020 | Hoel | ...................... B33Y 70/00 |
| 11,131,339 B1 | * | 9/2021 | Elbibary | ................. F16C 43/02 |

(Continued)

FOREIGN PATENT DOCUMENTS

CN          215444418 U          1/2022

*Primary Examiner* — Jesse S Bogue
(74) *Attorney, Agent, or Firm* — CANTOR COLBURN LLP (57) ABSTRACT

A ram air journal bearing shaft includes an additively manufactured body having a main body portion and a journal bearing portion. The main body portion and the journal bearing portion are coaxial along a first axis. The additively manufactured body includes at least a first set of regions additively manufactured using a first material and a second set of regions additively manufactured using a second material. At least a first set of heat exchanger fins extends from an outer diameter of the ram air journal bearing shaft to an inner diameter tie rod passage. Each heat exchanger fin in the first set of heat exchanger fins is additively manufactured as an integral structure to the additively manufactured body. A set of cooling air passages are disposed circumferentially about the first axis. Each cooling air passage is defined between adjacent heat exchanger fins of the first set of heat exchanger fins and the ram air journal bearing shaft is configured such that a cooling flowpath through the cooling air passages is established.

20 Claims, 4 Drawing Sheets

(56) References Cited

U.S. PATENT DOCUMENTS

| | | | |
|---|---|---|---|
| 11,668,324 B2 * | 6/2023 | Merritt | F04D 25/082 |
| | | | 417/369 |
| 12,060,799 B2 * | 8/2024 | Himmelmann | H02K 7/1823 |
| 12,180,854 B2 * | 12/2024 | Stotz | F01D 25/125 |

* cited by examiner

RAM AIR FAN INCLUDING BIMETALIC ADDITIVELY MANUFACTURED HEAT EXCHANGER INSERT

BACKGROUND

The present disclosure relates to ram air fan construction and, more particularly, to a bimetallic additively manufactured journal bearing shaft for a ram air fan.

Fans are often used to move air. Fans may, for example, move air through heat exchangers of air conditioning packs on an aircraft. The air moved by the fans cools the heat exchangers. Such fans within aircraft are often ram air fans. When the aircraft is on the ground, motors are typically used to rotate the rotors of the ram air fans. Absent intervention, thermal energy from the motor can buildup within components of fans used in this manner. Ram air fans typically include heat exchangers to remove heat from the components susceptible to thermal buildup.

Existing heat exchangers utilized for this purpose typically include heat dissipation fins constructed of folded sheet metal, with the fins being brazed, or otherwise affixed as a heat exchanger insert into a housing structure, such as a journal bearing shaft. This combined structure is placed in thermal communication with the motor, and cooling air is passed over the fins thereby cooling the motor. Such heat exchange structures are complex, expensive, time consuming to construct, and are difficult to repair.

BRIEF DESCRIPTION

Disclosed is a ram air journal bearing shaft includes an additively manufactured body having a main body portion and a journal bearing portion. The main body portion and the journal bearing portion are coaxial along a first axis. The additively manufactured body includes at least a first set of regions additively manufactured using a first material and a second set of regions additively manufactured using a second material. At least a first set of heat exchanger fins extends from an outer diameter of the ram air journal bearing shaft to an inner diameter tie rod passage. Each heat exchanger fin in the first set of heat exchanger fins is additively manufactured as an integral structure to the additively manufactured body. A set of cooling air passages are disposed circumferentially about the first axis. Each cooling air passage is defined between adjacent heat exchanger fins of the first set of heat exchanger fins and the ram air journal bearing shaft is configured such that a cooling flowpath through the cooling air passages is established.

In one example, the first set of regions transitions to the second set of regions via a discrete transition at at least one transition from a first region in the first set of regions to a second region in the second set of regions.

In one example, the first set of regions transitions to the second set of regions via a gradient transition at at least one transition from a first region in the first set of regions to a second region in the second set of regions.

In one example, the first material has a higher structural strength than the second material and wherein the first material has a lower thermal conductivity than the second material.

In one example, the first material is one of stainless steel and a nickel-chromium-based superalloy, and wherein the second material is one of copper and copper, nickel, nickel alloy, corrosion resistant steel, aluminum alloy.

In one example, the main body portion includes at least one region of the first set of regions and at least one region of the second set of regions.

In one example, the at least one region of the second set of regions is immediately radially outward of the set of cooling passages.

In one example, the main body portion, the journal bearing portion and the at least the first set of heat exchanger fins are a single integral structure defined by an absence of joints, fasteners, and brazing.

In one example, the ram air journal bearing shaft further includes at least a second set of heat exchanger fins extending from an outer diameter of the ram air journal bearing shaft to an inner diameter tie rod passage, each heat exchanger fins in the second set of heat exchanger fins being additively manufactured as an integral structure to the additively manufactured body.

Also disclosed is a process for constructing a journal bearing shaft for a ram air fan structure includes additively manufacturing a ram air journal bearing shaft. The ram air journal bearing shaft includes a body having a main body portion and a journal bearing portion. The main body portion and the journal bearing portion are coaxial along a first axis. The additively manufactured body includes at least a first set of regions additively manufactured using a first material and a second set of regions additively manufactured using a second material. The body further includes at least a first set of heat exchanger fins extending from an outer diameter of the ram air journal bearing shaft to an inner diameter tie rod passage. Each heat exchanger fin in the first set of heat exchanger fins is additively manufacture as an integral structure to the additively manufactured body. A set of cooling air passages is disposed circumferentially about the first axis. Each cooling air passage being defined between adjacent heat exchanger fins of the first set of heat exchanger fins and wherein the ram air journal bearing shaft is configured such that a cooling flowpath through the cooling air passages is established.

In one example, the first set of regions transitions to the second set of regions via a discrete transition at at least one transition from a first region in the first set of regions to a second region in the second set of regions.

In one example, the first set of regions transitions to the second set of regions via a gradient transition at at least one transition from a first region in the first set of regions to a second region in the second set of regions. In one example, In one example, the heat exchanger fins are additively manufactured using the second material, and at least one of the main body portion and the journal bearing portion being additively manufactured using the first material.

In one example, the first material has a higher structural strength than the second material and wherein the first material has a lower thermal conductivity than the second material.

In one example, the first material is one of stainless steel and a nickel-chromium-based superalloy, and wherein the second material is one of copper and copper, nickel, nickel alloy, corrosion resistant steel, aluminum alloy.

In one example, the main body portion includes at least one region of the first set of regions and at least one region of the second set of regions.

In one example, the at least one region of the second set of regions is immediately radially outward of the set of cooling passages.

In one example, the main body portion, the journal bearing portion and the at least the first set of heat exchanger fins are a single integral structure defined by an absence of joints, fasteners, and brazing.

In one example, the at least the first set of heat exchangers includes at least a second set of heat exchanger fins extending from an outer diameter of the ram air journal bearing shaft to an inner diameter tie rod passage, each heat exchanger fins in the second set of heat exchanger fins being additively manufactured as an integral structure to the additively manufactured body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

Figure 1:
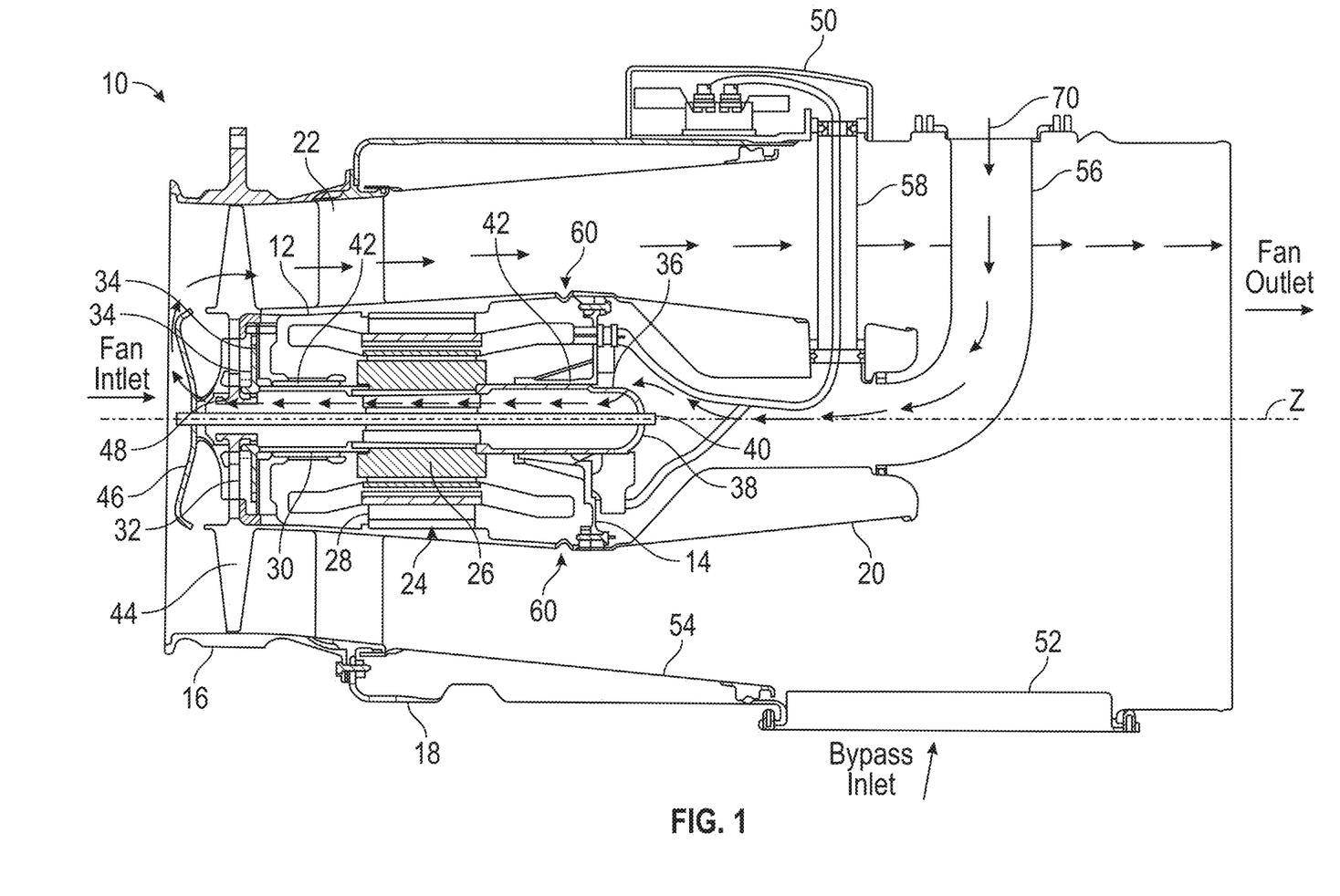
FIG. 1 is a ram air fan according to one exemplary embodiment.

FIG. 1 is a cross-sectional view of a ram air fan assembly 10 according to one example. It is appreciated that various structures and assemblies may be altered from the example embodiment while still falling within the scope of the systems and methods described herein. Ram air fan assembly 10 includes fan housing 12, bearing housing 14, inlet housing 16, outer housing 18, and inner housing 20. Fan housing 12 includes fan struts 22, motor 24 (including motor rotor 26 and motor stator 28), thrust shaft 30, thrust plate 32, and thrust bearings 34. Bearing housing 14 includes journal bearing shaft 36 and shaft cap 38. Fan housing 12 and bearing housing 14 together include tie rod 40 and journal bearings 42. Inlet housing 16 contains fan rotor 44, shroud 46, and hub 48, in addition to a portion of tie rod 40. Outer housing 18 includes terminal box 50 and plenum 52. Within outer housing 18 are diffuser 54, motor bearing cooling tube 56, and wire transfer tube 58. A fan inlet is a source of air to be moved by ram air fan assembly 10 in the absence of sufficient ram air pressure. A bypass inlet is a source of air that moves through ram air fan assembly 10 when sufficient ram air pressure is available. Ram air fan assembly 10 further includes drain holes 60 in fan housing 12. Axis Z extends along a central axis of ram air fan assembly 10.

As illustrated in FIG. 1, inlet housing 16 and outer housing 18 are attached to fan housing 12 at fan struts 22. Bearing housing 14 is attached to fan housing 12 and inner housing 20 connects motor bearing cooling tube 56 and wire transfer tube 58 to bearing housing 14. Motor bearing cooling tube 56 connects inner housing 20 to a source of cooling air at outer housing 18. Wire transfer tube 58 connects inner housing 20 to outer housing 18 at terminal box 50. Motor stator 28 and thrust plate 32 attach to fan housing 12. Motor rotor 26 is contained within motor stator 28 and connects journal bearing shaft 36 to thrust shaft 30. Journal bearing shaft 36, motor rotor 26, and thrust shaft 30 define an axis of rotation for ram fan assembly 10. Fan rotor 44 is attached to thrust shaft 30 with tie rod 40 extending along the axis of rotation from shaft cap 38 at the end of journal bearing shaft 36 through motor rotor 26, thrust shaft 30, and fan rotor 44 to hub 48 and shroud 46. Nuts (not shown) secure shaft cap 38 to journal bearing shaft 36 on one end of tie rod 40 and hub 48 and shroud 46 to fan rotor 44 at an opposite end of tie rod 40. Thrust plate 32 and fan housing 12 contain a flange-like portion of thrust shaft 30, with thrust bearings 34 positioned between the flange-like portion of thrust shaft 30 and thrust plate 32; and between the flange-like portion of thrust shaft 30 and fan housing 12. Journal bearings 42 are positioned between journal bearing shaft 36 and bearing housing 14; and between thrust shaft 30 and fan housing 12. Hub 48, shroud 46, fan rotor 44, and a portion of fan housing 12 are contained within inlet housing 16. Diffuser 54 is attached to an inner surface of outer housing 18. Plenum 52 is a portion of outer housing 18 that connects ram air fan assembly 10 to the bypass inlet. Inlet housing 16 is connected to the fan inlet and outer housing 18 is connected to the fan outlet.

In operation, ram air fan assembly 10 is installed into an environmental control system aboard an aircraft and connected to the fan inlet, the bypass inlet, and the fan outlet. When the aircraft does not move fast enough to generate sufficient ram air pressure to meet the cooling needs of the ECS, power is supplied to motor stator 28 by wires running from terminal box 50, through wire transfer tube 58, inner housing 20, and bearing housing 14. Energizing motor stator 28 causes rotor 24 to rotate about axis Z of ram fan assembly 10, rotating connected journal bearing shaft 36 and thrust shaft 30. Fan rotor 44, hub 48, and shroud 46 also rotate by way of their connection to thrust shaft 30. Journal bearings 42 and thrust bearings 34 provide low friction support for the rotating components. As fan rotor 44 rotates, it moves air from the fan inlet, through inlet housing 20, past fan struts 22 and into the space between fan housing 12 and outer housing 18, increasing the air pressure in outer housing 18. As the air moves through outer housing 18, it flows past diffuser 54 and inner housing 20, where the air pressure is reduced due to the shape of diffuser 54 and the shape of inner housing 20. Once past inner housing 20, the air moves out of outer housing 18 at the fan outlet.

Components within bearing housing 14 and fan housing 12, especially thrust bearings 34, journal bearings 42 and motor 24, generate significant heat and are cooled to prevent sub-optimal operation. Cooling air 70 is provided by motor bearing cooling tube 56 which directs the flow of cooling air 70 to inner housing 20. Inner housing 20 directs flow of cooling air to bearing housing 14, where the cooling air flows past components in bearing housing 14 and fan housing 12, cooling bearings 32, 40 and motor components. In some examples, one of the routes available for the cooling air is through the journal bearing shaft 36, allowing heat exchanger fins included within the journal bearing shaft 36 to enhance heat transfer and improve the cooling effect. Cooling air 70 then exits fan housing 12 through cooling holes in fan rotor 44. Condensation can form and settle in fan housing 12 when the cooling air mixes with the heat from thrust bearings 34, journal bearings 42, and motor 24 in fan housing 12. This condensation can cause problems with the operation of journal bearings 42 and motor 24. Drain holes 60 are provided in fan housing 12 to drain the condensation out of fan housing 12 and into the air flowing through ram air fan assembly 10 and out of the fan outlet.

The cooling air 70 of FIG. 1 is illustrated traveling along a single flowpath through the journal bearing shaft 36. It is appreciated that the cooling air 70 drawn through the cooling tube 56 may be passed along additional flowpaths through the inner housing 20 to cool additional components.

Existing ram air fan assemblies utilize cast and milled components, and the design features of the components are limited due to the limitations of those manufacturing processes. Utilization of modern additive manufacturing techniques, and particularly additively manufactured metal components, allows for the construction of parts having internal features and shapes, as well as tighter tolerances and thinner structural components while still allowing the components to be a single integral structure without using joints, fasteners, or material adhesion (e.g. brazing). The single integral piece designs facilitated by additive manufacturing reduce overall complexity and improve corresponding assembly processes.

By way of example, traditional journal bearing shafts are constructed of a multi-part structure including a main body, an end cap, and one or more heat exchanger insert. The heat exchanger insert is inserted through the journal bearing shaft structure and the end cap is inserted into one end of the main body to maintain the heat exchanger insert in place. The tie rod 40 maintains the main body, end cap and heat exchanger insert(s) in a correct relative axial position. The components are brazed together into a single structure prior to insertion of the tie rod, and assembly of the ram air fan including the journal bearing shaft.

This process is complex and expensive and can result in components having a heavier weight than desired. In addition, the multipart assembly limits the positioning of the heat exchanger insert within the main body and limits the resultant structure to imprecise fin placement and to uniform fin shapes. Furthermore, the traditional manufacturing process are limited to utilizing a single material when constructing a component. As a result, the single material is required to suitably meet structural requirements of the shaft, while at the same time meeting the thermal transfer requirements to achieve the desired cooling effects. This can result in material selection that, while suitable, is not optimal for a given portion of the journal bearing shaft.

Figure 2:
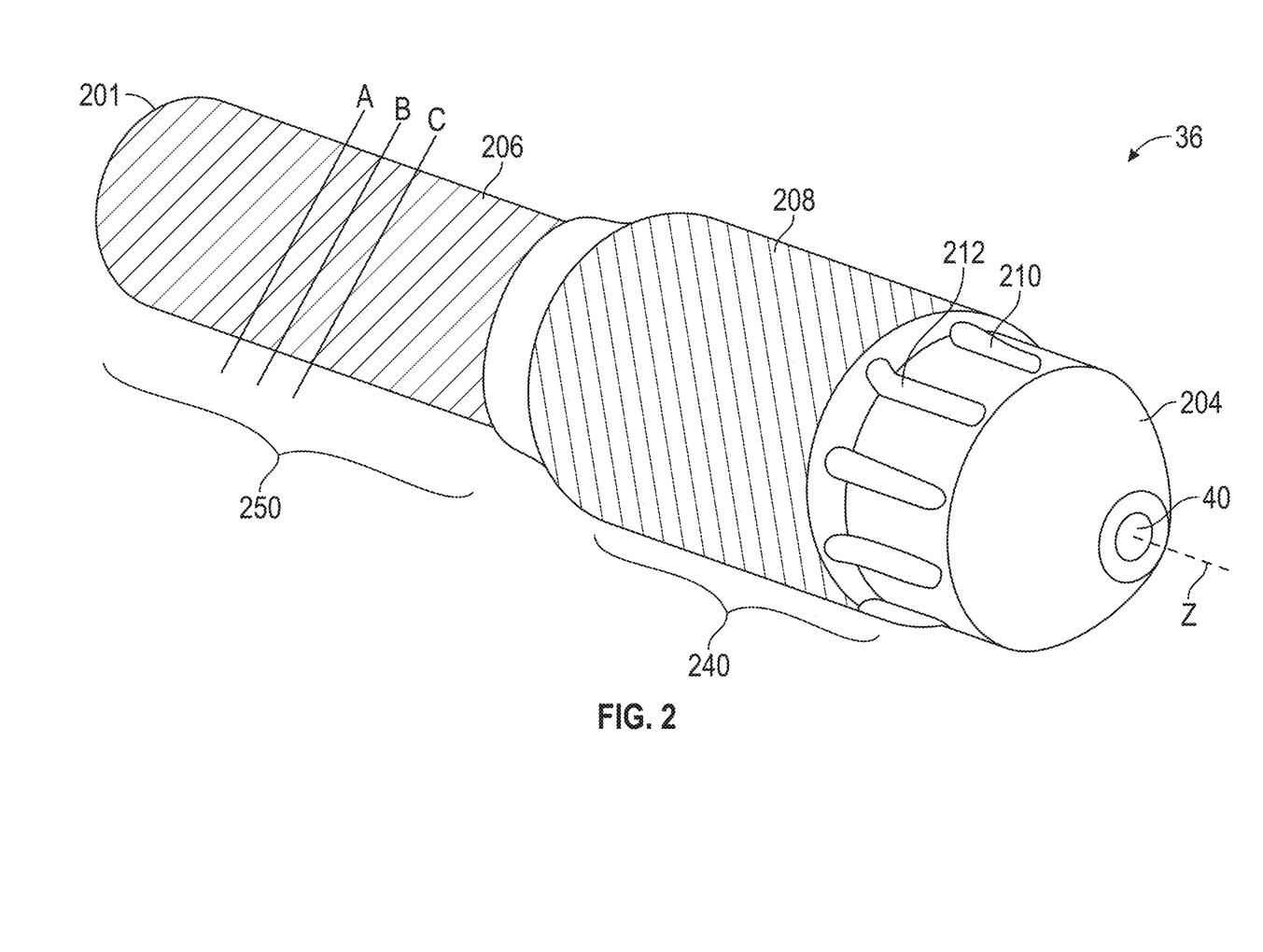
FIG. 2 is a journal bearing shaft for the ram air fan of FIG. 1.
Figure 3:
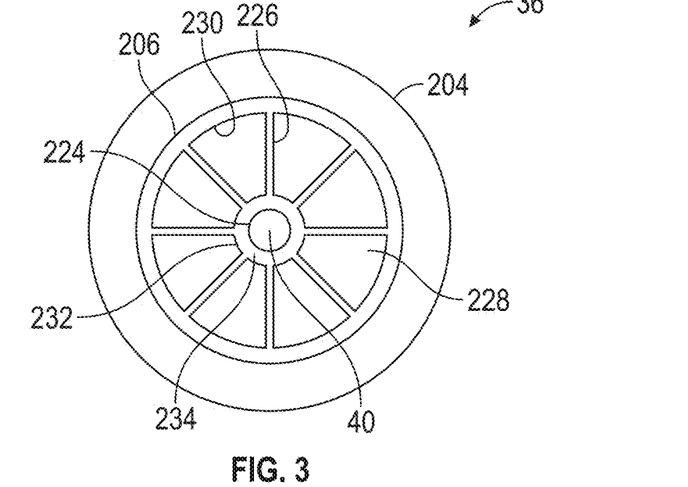
FIG. 3 is an axial end view of the journal bearing shaft of FIG. 2.

With continued reference to FIG. 1, FIG. 2 illustrates an isometric view of the journal bearing shaft 36, and FIG. 3 illustrates an axial end view of the journal bearing shaft 36. From a first axial end 201. The journal bearing shaft 36 includes a journal bearing interface portion 208, an end cap portion 204 and a main body portion 206. The three portions 204, 206, 208 are radially balanced about the axis Z, and are manufactured as a single integral piece using an additive manufacturing process. The additive manufacturing process allows for a construction of a suitable strength that omits the end cap flange and the joint between the main body portion 206 and the journal bearing interface portion 208 by building the components as a single additively manufactured piece. This manufacturing process allows for brazing (or similar fastening and adhering processes) journal bearing shaft assembly steps to be omitted entirely.

Furthermore, the journal bearing shaft 36 can, in some examples, include multiple distinct metal regions 240, 250 where one metal region (e.g., the region 240 at the journal bearing) is constructed of a first metal material that has a higher structural strength and a lower thermal conductivity than a second material used to construct the other metal region (e.g., the region 250 at the main body 206). In further examples, alternative designs where the distinct material regions are more common (e.g., where there are multiple discrete portions of the journal bearing shaft 36 that may benefit from higher thermal conductivity and have a lower loading requirement.)

Figure 6:
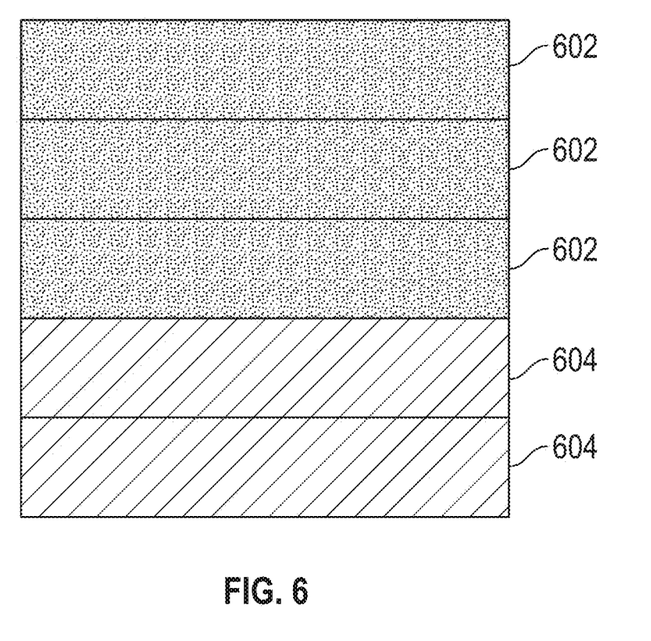
FIG. 6 illustrates a discrete material change in additive manufacturing.

In some examples, the different materials may have discrete separation at a single layer. In a discrete separation one layer of the additive manufacturing process is the first material, and then the next layer applied during the additive manufacturing process the additive manufacturing process is the second material. FIG. 6 illustrates a first set of layers 602, 604 manufactured according to the discrete separation example, with the layers 602 being entirely the first material and the layers 604 being entirely the second example and with diagonal cross hatching indicating an amount of the first material and dotting indicating an amount of the second material.

Figure 7:
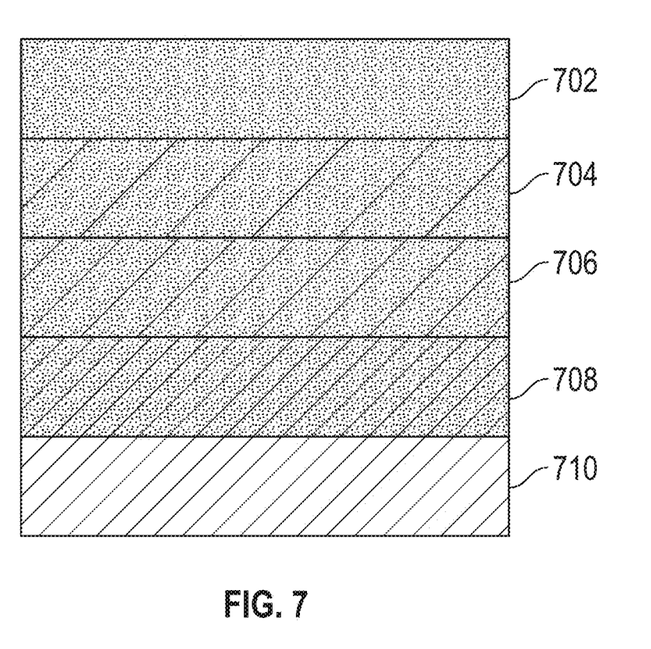
FIG. 7 illustrates a gradient material change in additive manufacturing.

FIG. 7 illustrates an example gradient process. FIG. 7 includes a set of layers 702, 704, 706, 708, 710 where diagonal cross hatching indicates an amount of the first material and dot hatching indicates an amount of the second material. The materials, are gradually blended together using one or more gradient layers 704, 706, 708, where each subsequently applied layer 704, 706, 708, 710 has an increasing composition of one metal material and a decreasing composition of the other material. The resultant structure is a journal bearing shaft without discrete transitions between the metallic regions, but still having multiple distinct metallic region characteristic of a bimetallic structure.

The additive manufacturing process allows heat exchanger fins 226 to be manufactured directly inside the journal bearing shaft 36 as integral components of the journal bearing shaft 36, allowing for greater flexibility and variability in the positioning of the heat exchanger fins 226, greater preciseness of the heat exchanger fins 226, and the inclusion of internal complex features within, as well as on, the heat exchanger fins 226. In the example of FIG. 3, the heat exchanger fins 226 are illustrated with exaggerated circumferential thickness (thickness aligned with the outer circumference 230) and in lower number than most practical examples for the purposes of explanation. In a practical example, at a given axial position along axis Z there may be between 12 and 64 heat exchanger heat exchanger fins 226 disposed evenly about axis Z. In one particular example, at a given axial position along axis Z there are 24 heat exchanger fins 226. In alternative practical examples, the heat exchanger fins 226 may be disposed unevenly, but rotationally balanced, about the axis Z.

In some examples, the heat exchanger heat exchanger fins 226 may extend a full length of the journal bearing shaft 36.

In other examples, the heat exchanger heat exchanger fins 226 may be localized at specific axial positions of the journal bearing shaft, along axis Z, where heat transfer may be required in order to fully cool the corresponding components. In such an example, the heat exchanger fins 226 are referred to as having one or more axial gap.

In some examples including an axial gap, the distinct metal regions 240, 250 corresponds to the placement of the heat exchanger fins 226. In such examples, the region 250 in which the heat exchanger fins 226 are located benefits from a higher thermal conductivity, and has a lower strength requirement. In these regions 250 the second material is used, and the first material is used for a remainder of the journal bearing shaft.

In another example, the heat exchanger fins 226 may be manufactured using the second material, while an outer body of the journal bearing shaft 36 is manufactured using the first material.

The heat exchanger fins 226 extend from an inner circumference 230 of an outer wall of the journal bearing shaft 36 to an outer circumference 232 of a tie rod 40 support wall 234. Passages 228 are defined between adjacent heat exchanger fins 226.

A set of openings 210 at the endcap portion 204 provide a cooling air passages 212 that allows the cooling air flow 70 to enter the interior of the journal bearing shaft 36 and pass through passages 228. The journal bearing shaft 36 is additively manufactured using a first metal material such as stainless steal, a nickel-chromium-based superalloy (e.g., Inconel®), or any metal having similar structural and thermal properties and using a second metal material such as copper, nickel, nickel alloy, corrosion resistant steel, aluminum alloy or metals having similar thermal conductivity. The combined structure provides sufficient structural strength using the first metal and a thermal pathway for heat to transfer from an adjacent electric motor 26 to cooling air 70 flowing through the journal bearing shaft 36 using the second metal. By constructing the journal bearing shaft 36 as a single integral bimetallic piece using additive manufacturing techniques, multiple structural improvements over the previous construction using multiple joined pieces can be achieved.

In some examples the improved structural features include substantially tighter tolerances, with thinner components. This improvement allows a lighter structure for the heat exchanger insert 220, while still ensuring adequate heat transfer through the heat exchanger fins 226.

In another example, additive manufacturing allows the heat exchanger fins 226 to be grown directly into the journal bearing shaft 36, reducing the need for a separate outer circumference wall of a heat exchanger insert, thereby allowing a thinner outer wall of the journal bearing shaft, and an increase in the thermal conductivity of the overall journal bearing shaft 36. In addition, this eliminates the need for a braze, or other material based adherence, thereby causing the manufacturing process to be cheaper and substantially simplified. Even further still, directly growing the heat exchanger heat exchanger fins 226 within the journal bearing shaft 36 facilitates the inclusion of axial gaps within the heat exchanger heat exchanger fins 226 without requiring inclusion of spacers, or other internal structures, to maintain the desired axial spacing between the sets of heat exchanger heat exchanger fins 226.

In another example, the heat exchanger fins 226 can be precisely placed, such that they are evenly distributed, and create an easily predictable flowpath through the journal bearing shaft 36, and the heat exchanger fins 226 can be distributed at the precise axial locations where the heat transfer is desired, without requiring the location to be directly accessible via an insert. In addition, due to the additive manufacturing, the heat exchanger fins 226 can include different features at different axial positions, including different thicknesses, different surface features, rotations, and the like all within a single journal bearing shaft 36, and without complexity of assembly. In addition, the tighter tolerances allow for more precisely evenly spaced heat exchanger fins 226, thereby improving the native balance of the journal bearing shaft 36 and minimizing the complexity and cost of a component balancing step.

In yet another example, the heat exchanger fins 226 can be constructed of the second material, while the structurally supporting portions of the journal bearing shaft 36 are constructed of the first material, thereby improving heat transfer at the heat exchanger fins 226 without compromising structural stability.

Furthermore, as components of a ram air fan are balanced individually, constructing the journal bearing shaft 36 as a single integral structure requires only a single balancing action, rather than four distinct balancing actions, during the assembly process. This can further reducing the complexity of assembly.

In yet further examples, the additive manufacturing process can be utilized to incorporate additional non-castable features into the heat exchanger heat exchanger fins 226. The non-castable features are any physical structures that either could not be cast due to materials and existing technique limitations, could not be milled due to tooling limitations, and/or would be cost prohibitive to create using existing casting and/or milling techniques. By way of example, internal features in tight tolerances are non-castable as even using expendable mold casting techniques as the material of the mold cannot be fully cleared out of the internal passages when the non-castable features are present. Furthermore, by additively manufacturing the component as a single structure, the non-castable features can be included in less than the full length of the journal bearing shaft 36 and are not required to be distributed evenly along the axis Z.

In addition to the above general structural improvements derived via additively manufacturing the heat exchanger inserts, certain specific non-castable features and example features can be created.

With continued reference to FIGS. 1-3 and 6-7, FIG. 4 illustrates a highly schematic cross section of the journal bearing shaft 36 at a first axial position (axial position A) and a second axial position (axial position B). From axial position A to axial position B, heat exchanger fins 424 define a spiraling passage feature enabled by using additive manufacturing to construct the fins 424 integral to, and along with, the journal bearing shaft 36.

Figure 4:
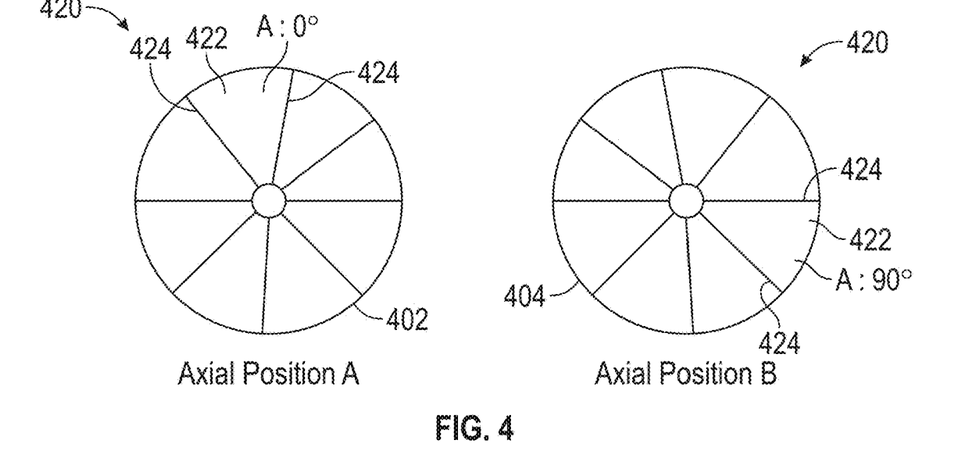
FIG. 4 is an interior heat exchanger portion of the journal bearing shaft of FIG. 2 at two positions according to another example.

In the example of FIG. 4, a set of cooling fluid passages 422 are defined between adjacent heat exchanger fins 424. Each of the cooling fluid passages 422 rotates about the axis Z as the passage 422 travels along the axis Z (e.g., from axial position B to axial position A). In the illustrated example, a first passage 422, labeled "A" is positioned at a 0 degree position about the axis Z at the inlet end 402, and has rotated about the axis to a 90 degree position about the axis Z at the outlet end 404. It is appreciated that the 90 degree rotation of the axial positions A and B is inclusive of 450 degree rotation, 810 degree rotation, or any other 360*n+90 degree rotation, with the number of times the rotation wraps fully around the axis Z (n) determining an angle of travel through the passages 422 relative to the axis Z. Furthermore, it is appreciated that terminating the section with a net 90 degree rotation is an arbitrary rotation amount for illustration and practical examples can include any rotation amount.

This rotation increases the distance that cooling air travels through the passages 422 in a given axial distance, thereby increasing the time that the cooling air is exposed to the fins 424 and increasing the amount of heat removed from the fins 424, and from the components to which the fins 424 are thermally connected. This gain is offset by an increased obstruction to airflow with a greater rotation about the axis Z resulting in more heat removal, but less free airflow. One of skill in the art can balance these offsets to meet the needs of a particular ram air fan structure.

Figure 5:
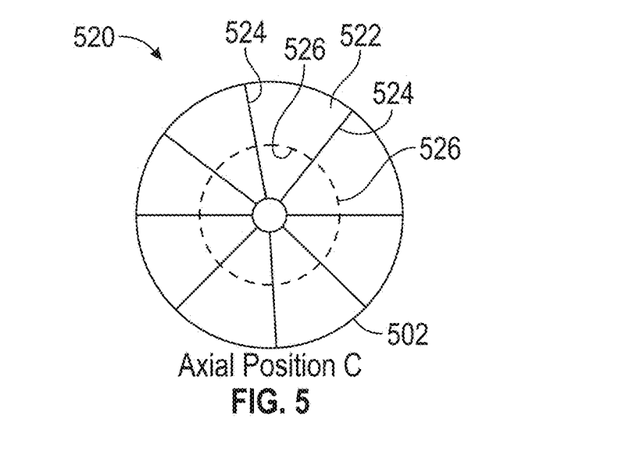
FIG. 5 is an interior heat exchanger portion of the journal bearing shaft of FIG. 2 at a third position according to yet another example.

With continued reference to FIGS. 1-3, FIG. 5 illustrates a highly schematic cross section of the journal bearing shaft 36 at a third axial position (axial position C) along the journal bearing shaft 36. As with the axial positions A and B, set of passages 522 is defined between radially adjacent fins 524. In the example of FIG. 5, each of the fins 524 includes one or more features 526 extending outward from a surface of the fin 524 into the adjacent passage 522. The features 526 increase a surface area of the fin 524 that is exposed to cooling air flowing through the passage 522, thereby increasing heat transfer from the fin 524 to the cooling air. As with the example of FIG. 4, the additional features 526 restrict airflow and, as a result, a cost benefit analysis is required to determine the particular placement, and amount of features 526, as well as how far into the passages 522 the features 526 extend.

In the illustrated example of FIG. 5, each fin 524 includes a first feature 526 extending circumferentially outward into one adjacent passage 522 and a second feature 526 extending circumferentially outward into the other adjacent passage 522 with both features 526 being disposed at approximately 50% span of the fin 524. In alternative examples multiple features 526 may extend from a fin 524 into a single adjacent passage 522, the features may include alternate shapes, and/or the features 526 may be disposed at different span positions than the position illustrated.

The example journal bearing shaft features of FIGS. 3, 4 and 5 are illustrated as distinct examples for the purposes of explaining particular features. It is appreciated in the art that the features descried and illustrated in FIGS. 3, 4 and 5 may be combined in a single journal bearing shaft in any combination of all or some of the features depending on the requirements of a particular implementation, and still fall within the instant disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ram air journal bearing shaft comprising:
   an additively manufactured metal body having a main body portion and a journal bearing portion, wherein the main body portion and the journal bearing portion are coaxial along a first axis, and wherein the additively manufactured metal body includes at least a first set of regions additively manufactured using a first material and a second set of regions additively manufactured using a second material;
   at least a first set of heat exchanger fins extending from an outer diameter of the ram air journal bearing shaft to an inner diameter tie rod passage, each heat exchanger fins in the first set of heat exchanger fins being additively manufactured as an integral structure to the additively manufactured metal body; and
   a set of cooling air passages disposed circumferentially about the first axis, each cooling air passage being defined between adjacent heat exchanger fins of the first set of heat exchanger fins and wherein the ram air journal bearing shaft is configured such that a cooling flowpath through the cooling air passages is established.

2. The ram air journal bearing shaft of claim 1, wherein the first set of regions transitions to the second set of regions via a discrete transition at at least one transition from a first region in the first set of regions to a second region in the second set of regions.

3. The ram air journal bearing shaft of claim 1, wherein the first set of regions transitions to the second set of regions via a gradient transition at at least one transition from a first region in the first set of regions to a second region in the second set of regions.

4. The ram air journal bearing shaft of claim 1, wherein the heat exchanger fins are additively manufactured using the second material, and at least one of the main body portion and the journal bearing portion being additively manufactured using the first material.

5. The ram air journal bearing shaft of claim 1, wherein the first material has a higher structural strength than the second material and wherein the first material has a lower thermal conductivity than the second material.

6. The ram air journal bearing shaft of claim 5, wherein the first material is one of stainless steel and a nickel-chromium-based superalloy, and wherein the second material is one of copper and copper, nickel, nickel alloy, corrosion resistant steel, aluminum alloy.

7. The ram air journal bearing shaft of claim 5, wherein the main body portion includes at least one region of the first set of regions and at least one region of the second set of regions.

8. The ram air journal bearing shaft of claim 7, wherein the at least one region of the second set of regions is immediately radially outward of the set of cooling passages.

9. The ram air journal bearing shaft of claim 1, wherein the main body portion, the journal bearing portion and the at least the first set of heat exchanger fins are a single integral structure defined by an absence of joints, fasteners, and brazing.

10. The ram air journal bearing shaft of claim 1 further comprising at least a second set of heat exchanger fins extending from an outer diameter of the ram air journal bearing shaft to an inner diameter tie rod passage, each heat exchanger fins in the second set of heat exchanger fins being additively manufactured as an integral structure to the additively manufactured metal body.

11. A process for constructing a journal bearing shaft for a ram air fan structure, the process comprising:

additively manufacturing a ram air journal bearing shaft, wherein the ram air journal bearing shaft includes an additively metal body having a main body portion and a journal bearing portion, wherein the main body portion and the journal bearing portion are coaxial along a first axis, and wherein the additively manufactured metal body includes at least a first set of regions additively manufactured using a first material and a second set of regions additively manufactured using a second material, the additively manufactured metal body further including at least a first set of heat exchanger fins extending from an outer diameter of the ram air journal bearing shaft to an inner diameter tie rod passage, each heat exchanger fins in the first set of heat exchanger fins being additively manufacture as an integral structure to the additively manufactured metal body; and wherein a set of cooling air passages is disposed circumferentially about the first axis, each cooling air passage being defined between adjacent heat exchanger fins of the first set of heat exchanger fins and wherein the ram air journal bearing shaft is configured such that a cooling flowpath through the cooling air passages is established.

12. The process of claim 11, wherein the first set of regions transitions to the second set of regions via a discrete transition at at least one transition from a first region in the first set of regions to a second region in the second set of regions.

13. The process of claim 11, wherein the first set of regions transitions to the second set of regions via a gradient transition at at least one transition from a first region in the first set of regions to a second region in the second set of regions.

14. The ram process of claim 11, wherein the heat exchanger fins are additively manufactured using the second material, and at least one of the main body portion and the journal bearing portion being additively manufactured using the first material.

15. The process of claim 11, wherein the first material has a higher structural strength than the second material and wherein the first material has a lower thermal conductivity than the second material.

16. The process of claim 15, wherein the first material is one of stainless steel and a nickel-chromium-based superalloy, and wherein the second material is one of copper and copper, nickel, nickel alloy, corrosion resistant steel, aluminum alloy.

17. The process of claim 15, wherein the main body portion includes at least one region of the first set of regions and at least one region of the second set of regions.

18. The process of claim 17, wherein the at least one region of the second set of regions is immediately radially outward of the set of cooling passages.

19. The process of claim 11, wherein the main body portion, the journal bearing portion and the at least the first set of heat exchanger fins are a single integral structure defined by an absence of joints, fasteners, and brazing.

20. The process of claim 11 wherein the at least the first set of heat exchangers includes at least a second set of heat exchanger fins extending from an outer diameter of the ram air journal bearing shaft to an inner diameter tie rod passage, each heat exchanger fins in the second set of heat exchanger fins being additively manufactured as an integral structure to the additively manufactured metal body.

* * * * *